United States Patent [19]

Brandenburg et al.

[11] Patent Number: 5,291,960
[45] Date of Patent: Mar. 8, 1994

[54] HYBRID ELECTRIC VEHICLE REGENERATIVE BRAKING ENERGY RECOVERY SYSTEM

[75] Inventors: Larry R. Brandenburg, Northville; Edward T. King, Dearborn, both of Mich.

[73] Assignee: Ford Motor Company, Dearborn, Mich.

[21] Appl. No.: 983,206

[22] Filed: Nov. 30, 1992

[51] Int. Cl.$^5$ .............................................. B60L 11/02
[52] U.S. Cl. ................................ 180/65.2; 123/41.14; 180/65.4; 219/208; 237/12.3 B; 237/75
[58] Field of Search .......................... 237/12.3 B, 75; 180/65.1, 65.2, 65.3, 65.4; 219/202, 205, 208; 123/41.14

[56] References Cited

U.S. PATENT DOCUMENTS

| | | | |
|---|---|---|---|
| 3,853,270 | 12/1974 | Prebil | 237/12.3 B |
| 3,870,855 | 3/1975 | Edlund et al. | 219/202 |
| 4,188,527 | 2/1980 | Follmer | 219/202 |
| 4,258,677 | 3/1981 | Sanders | 123/41.14 X |
| 4,470,476 | 9/1984 | Hunt | 180/65.2 |
| 4,532,894 | 8/1985 | Wulf et al. | 123/142.5 E |
| 4,562,894 | 1/1986 | Yang | 180/65.2 |
| 4,597,463 | 7/1986 | Barnard | 180/65.3 X |
| 4,611,466 | 9/1986 | Keedy | 60/714 |
| 4,951,761 | 8/1990 | Kawamura | 180/65.4 |
| 5,172,784 | 12/1992 | Varela, Jr. | 180/65.4 |
| 5,211,334 | 5/1993 | Schatz | 237/12.38 |

FOREIGN PATENT DOCUMENTS

| | | |
|---|---|---|
| 659557 | 3/1963 | Canada. |
| 814897 | 6/1959 | United Kingdom. |

*Primary Examiner*—Margaret A. Focarino
*Assistant Examiner*—Michael Mar
*Attorney, Agent, or Firm*—Jerome R. Drouillard; Roger L. May

[57] ABSTRACT

A series hybrid engine has an electric traction motor drive of the vehicle wheels and a regenerative braking system that converts the motor to a generator for the output of useful electrical energy, the latter being used either to charge the storage battery for a power source for the traction motor, or if the battery is charged, diverting the regenerative energy to a resistive heater located in the cooling circuit of an independently operated accessory driving ICE; the resistive heater providing heat to the coolant to preheat the ICE prior to engine start-up; or, alternatively, or concurrently to supply heat to the core of a heater for the passenger compartment of the vehicle, or, to store the heat in a heat battery type reservoir for future use.

13 Claims, 1 Drawing Sheet

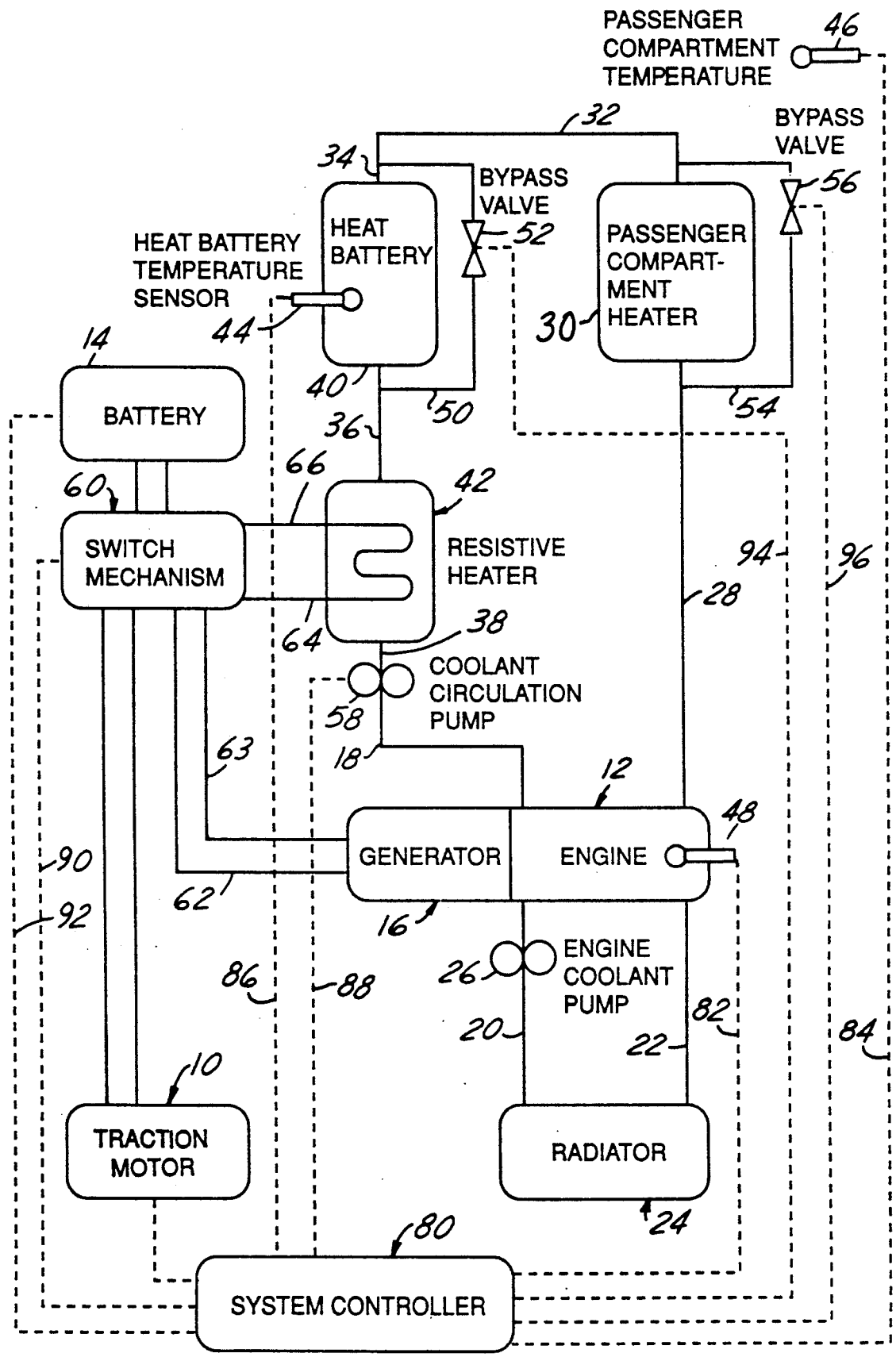

HYBRID ELECTRIC VEHICLE REGENERATIVE BRAKING ENERGY RECOVERY SYSTEM

FIELD OF THE INVENTION

This invention relates in general to a series hybrid vehicle having electric motor driven wheels and an internal combustion engine (ICE) for driving a power source for the electric motors. More particularly, it relates to one in which the electrical energy generated during regenerative braking of the vehicle is fully utilized either as a power source or alternately as a heat source for other elements of the vehicle.

BACKGROUND OF THE INVENTION

Hybrid vehicles generally consist of an electric traction motor, or motors, that drive the vehicle wheels, storage batteries to supply electrical energy to the traction motor, and some sort of generator/alternator driven by an internal combustion engine (ICE) to charge the batteries and/or provide the power for the traction motor. In a series hybrid vehicle, there is no mechanical connection between the drive wheels and the ICE. The ICE is used only to drive the alternator/-generator. The engine/alternator combination provides a means of converting the chemical energy of the fuel to electrical energy.

This invention is directed specifically to a series hybrid type of vehicle having a regenerative braking system in which the drive motor is converted to a generator that provides a large and often excessive output of useful electrical energy. More particularly, it is directed to a construction for recovering the useful energy that is normally wasted if, for example, the storage battery is already fully charged.

In a hybrid vehicle, start-up of the ICE is independent of the initial drive-away of the vehicle since the ICE does not power the wheels of the vehicle. When this is possible, the conditions under which engine start-up occurs can be optimized. It is well documented that nearly 80% of a conventional ICE-powered automobile's emissions are generated during cold start-up and drive-away, as mentioned above. An engine maintained at some elevated temperature, optimally 125° F. to 180° F., for example, could be started without the need for fuel enrichment, i.e., air/fuel ratios richer than stoichiometric (chemically correct air/F ratio), resulting in significantly improved exhaust emissions.

The invention provides a unique energy recovery system for the regenerative braking system of the hybrid vehicle. It utilizes a control system that allows the traction motor to function as a generator during braking to absorb the vehicle's kinetic energy that normally would be dissipated and lost by conventional brakes. The kinetic energy is converted to electrical energy that can recharge the storage batteries, provide heat to the ICE coolant and other components of the ICE, or be stored for future use in a heat battery type storage device.

In general, in a hybrid vehicle equipped with regenerative braking, a normal use scenario would be that the operator would recharge the vehicle every night to ensure maximum battery energy for the following day's usage. A fully charged battery, however, precludes utilization of regenerative braking and the associated recoverable energy until the battery has been somewhat depleted and allows room to accept the energy from the regenerative braking.

This invention is directed specifically to a system for recovering the electrical energy developed during regenerative braking that is in excess of that necessary to charge the vehicle's storage battery, so that the energy is not wasted. In this particular case, the excess energy is used to heat the ICE coolant to prewarm the engine when it is inoperative and the coolant is below a predetermined temperature level, and also to provide heat to the vehicle passenger car compartment heater, and to store excess heat in a heat battery for future use.

The system would perform a dual function in that it would act as an "energy reservoir" as well as allow regenerative braking to function at all times. Normally, in a conventional installation, the regenerative braking must be shut off if the storage battery cannot use it. This system eliminates that disadvantage since the energy reservoir can be tapped to, as stated, preheat the engine for low emission start-ups, heat the passenger compartment, or be stored in a heat battery for future use.

The invention, therefore, is directed specifically to the utilization of the electrical energy generated during regenerative braking of the hybrid vehicle so that the regenerative braking need not be shut off.

DESCRIPTION OF THE PRIOR ART

U.S. Pat. No. 4,188,527 to Follmer describes an automotive type installation in which the alternator, below a predetermined engine coolant temperature, is connected to a resistive heater located in the air intake of the carburetor. A bypass is provided to the engine passenger compartment heater to provide quick heat. Above the predetermined temperature, the resistive heater is turned off. The ICE then provides a normal vehicle electrical system.

U.S. Pat. No. 4,532,894 to Wulf et al. describes an electric drive and a heater 11 supplied by the current during the electrified portion of the drive route. Heat to the passenger compartment is also supplied, but there is no storage of excess electrical energy, and Wulf does not describe regenerative braking. Heat to the passenger compartment is by way of the engine coolant water that passes through the heating element 11. during the no drive electricity condition, the use of a storage battery is made to drive heater 10.

Canadian 659,557 to Naves relates to a diesel electric drive locomotive-type engine that utilizes the auxiliary traction generator driven by the locomotive during idling to supply the electrical power to immersion heaters to keep the engine coolant warm. When warm, the circuit opens and the heat is cut off, but any generator excess electrical energy is not utilized but wasted. A storage battery is mentioned, but no description of supplying excess electrical energy to recharge it is described.

U.S. Pat. No. 4,611,466 to Keedy describes a truck system having main and auxiliary engines. The auxiliary engine drives an alternator to provide electricity for heating the engine coolant, passenger compartment, etc. Exhaust gas is used as a heat source. The auxiliary engine is turned on when the main engine is turned off. Both the main and auxiliary engines drive a generator 38. In FIG. 3, a separator generator is driven by the auxiliary engine. There is no storage of excess or waste electrical energy and no heat battery or regenerative braking is described.

U.S. Pat. No. 4,951,769 to Kawamura describes a hybrid vehicle in which regenerative braking is provided by the driving motor being converted to a generator to produce electrical energy to charge the battery used to drive the motor. A diesel engine drives a generator 2 that supplies the AC electrical power to the drive wheel motor 8 with AC power. When the wheel rotational signal WR is greater than the signal from the vehicle accelerator pedal indicating coasting, the motor is converted to an AC generator and reconverted to DC and regenerative braking occurs providing DC electricity to charge battery 11. However, there is no other use of electrical energy of the regenerative braking and there is no storage or heating of the passenger compartment or ICE coolant, etc.

British 814,897 to Baier et al. shows a heater unit for heating an ICE driven by an electrical motor (could be an ICE) supplied either by a generator 6 or a battery or an accumulator 7. In FIG. 2, the motor is replaced by a motor-generator coupled to the prime motor to charge the battery, or to be energized by it.

U.S. Pat. No. 3,870,855 to Edlund et al. describes a cold weather starting system for a motor vehicle for electrically heating the vehicle and charging the vehicle battery. The electrical power, however, is supplied by house current.

U.S. Pat. No. 4,258,677 to Sanders describes a system for storing heat from the vehicle exhaust system to warm the engine lubricant or coolant. It uses eutectic salt mixtures or single salts, for example, palma. This is merely a heat bank or a heat battery, per se, to warm the engine coolant.

The above-described prior art shows some isolated features common to the invention; i.e., regenerative braking, the use of the energy to warm the engine coolant, and a heat battery, per se. However, none show a regenerative braking system in which the electrical energy generated during the braking is utilized not only to recharge the main storage battery, but also to provide power to a resistive heater located in the ICE coolant circuit to not only warm the coolant to prewarm the engine prior to start-up, but also send supply heat to the passenger car heater as well as to a heat battery to store the excess heat.

SUMMARY OF THE INVENTION

The invention allows the recovery and utilization of regenerative braking energy from a hybrid vehicle traction motor that is normally lost when the vehicle storage battery is fully charged, or incapable of absorbing all of the energy developed by regenerative braking. The system includes a resistive heating element located in the liquid cooling system of the hybrid vehicle's ICE, the latter being used at times to drive a generator to provide a power source for the traction motor drive mode of the vehicle. The system performs a dual function in that it acts not only as an energy reservoir to allow regenerative braking to function at all times, but a reservoir that can be tapped to preheat the engine for low emission start-ups, heat the passenger compartment, or be stored in the heat battery for future use. In conventional hybrid vehicles using regenerative braking, after the conventional storage battery is recharged to its full capacity, then the regenerative braking must be shut down or off since there is no other use for its output and it is, therefore, wasted. When this occurs, the shutoff can result in an annoying change in the brake "feel" to the vehicle operator, which is another disadvantage of not recovering unused regenerative braking energy.

It is, therefore, a principal object of the invention to provide a hybrid vehicle having a traction motor with a regenerative braking system that can utilize essentially all of the electrical energy generated during the braking process so that the regenerative braking need not be shut off.

It is a further object of the invention to provide a hybrid vehicle regenerative braking system of the type described above in which an independently operable ICE, normally used to provide electrical energy for the power source for the traction motor drive mode, has an independent start-up, and is prewarmed to provide lower exhaust emissions, by the regenerative braking electrical energy operating a resistive heater in the ICE coolant circuit that can also supply heat to the passenger compartment heater, and store excess electrical energy in a heat battery for future use.

Other objects, features and advantages of the invention will become more apparent upon reference to the succeeding detailed description thereof, and to the drawing showing the preferred embodiment thereof.

BRIEF DESCRIPTION OF THE DRAWING

The single sheet schematically and diagrammatically illustrates a regenerative braking energy utilization system embodying the invention.

DESCRIPTION OF THE PREFERRED EMBODIMENT

The figure depicts schematically a hybrid vehicle having an electrically powered traction motor 10 for driving the vehicle wheels, provided with a regenerative braking system, and an independently operable ICE indicated by the block 12. The details of construction and operation, per se, of traction motor 10 and ICE 12 are not given as they are believed to be unnecessary for an understanding of the invention. Suffice it to say that the motor 10 would be an electrical traction motor supplied with electrical energy from a power source such as a conventional storage battery indicated at 14, or by an alternator/generator indicated at 16, or by a combination of the two. The alternator/generator 16, in this case, is powered by the ICE 12. The drive of the wheels of the hybrid vehicle could be by known means not shown.

The ICE would drive only the alternator/generator 16, and, therefore, as stated, be independent of the start-up of traction motor 10. As such, the ICE would be shut down and not run a large majority of the time. However, to minimize exhaust emissions upon start-up of the ICE. it is desirable to warm the engine coolant to its operating temperature so that upon start-up, richer fuel/air ratios other than stoichiometric need not be used and, therefore, the output of emissions would be reduced.

As stated previously, the basic premise of the invention is to utilize the otherwise wasted electrical energy generated during regenerative braking of the traction motor 10, rather than shut off the regenerative braking if the storage battery 14 is already fully charged.

The ICE is provided with a closed loop coolant circulating system into and out of the engine defined by the conduits 18, 20, and 22, which include a conventional automotive radiator-type heat exchanger 24 for maintaining the coolant within the normal temperature operating range when the engine 12 is in running condition, in a known manner. An engine coolant pump 26 would be rendered operative at times for this purpose.

An auxiliary circuit for the coolant includes a conduit 28 connected to the core of a heater in the passenger compartment of the vehicle, the coolant continuing out of the heater through a conduit 32 and connecting conduits 34, 36, and 38, to return finally to ICE input conduit 18. The auxiliary circuit also includes a heat battery indicated at 40 for storage of excess heat energy not utilized for other purposes. Such heat batteries have a high capacity storage ability and store waste heat efficiently by using high-vacuum thermal insulation, for example.

Such heat batteries are well known, such as is shown, for example, by U.S. Pat. No. 4,258,677 to Sanders in which eutectic salt mixtures are used. The details of construction and operation, per se, of the heat battery are not given since they are believed to be unnecessary for an understanding of the invention. Suffice it to say, however, that heat imparted to the heat battery could melt an ice-like frozen water/salt mixture (eutectic) and in effect would be captured in the fluid state of the eutectic. Such heat batteries can store significant amounts of thermal energy because nearly all materials require large amounts of energy to change them from their solid phase to the liquid phase; i.e., melt.

In order to utilize the electrical energy supplied during regenerative braking in excess of that required by storage battery 14, a resistive heater 42 is included in the coolant circuit between conduit branches 36 and 38. The heat generated by the resistive heater would first be used to preheat the ICE if the engine coolant temperature is below its start-up or predetermined level. Alternatively, or concurrently, the heat could be supplied upon demand to the passenger compartment heater 30. If all of the elements, such as storage battery 14, ICE 12, and the passenger compartment heater 30 have all the heat that is needed for their particular uses, then any additional heat can be stored in the heat battery 40.

Completing the construction, both heat battery 40 and the passenger compartment heater 30, as well as the ICE 12, are provided with temperature sensors 44, 46, and 48, respectively, for a purpose to be described. The heat battery 40 is also provided with a coolant bypass circuit 50 containing a two-position bypass valve 52 operated electrically to block or unblock the bypass circuit. The passenger compartment heater 30 likewise has a bypass coolant circuit 54 with a bypass two-position valve 56 also electrically controlled to block or unblock the circuit. The output from the resistive heater leading to the ICE further contains a coolant circulation pump 58 that would become operable whenever regenerative braking electrical energy is supplied to the resistive heater.

A switch mechanism 60 is provided between storage battery 14 and the traction motor 10, and is operably connected as shown by lines 60, 62, 64, and 66 to the ICE generator 16 as well as to the resistive heater 42 to control distribution of the regenerative braking electrical energy and that supplied by generator 16, in a manner to be described.

The system further includes a controller indicated in general at 80 that would consist of a microprocessor or the like for sensing the operating conditions of the system for controlling current flow to switch 60 and therefrom to battery 14 or the resistive heater 42, or traction motor 10 to provide the operations called for. More particularly, controller 80 is connected by signal lines 82 and 84 from the engine and heater temperature responsive elements 48 and 46, respectively, and by signal lines 86 and 88 to the heat battery temperature sensor 44 and the coolant circulation pump 58, respectively. The controller is further connected by lines 90 and 92 to switch mechanism 60 and storage battery 14, respectively, The two bypass valves 52 and 56 are further connected by current carrying lines 94 and 96, respectively, to controller 80.

In overall operation, at vehicle start-up, the charge condition of the storage battery 14 is initially sensed through line 92 by the system controller 80. If satisfactory, the controller 80 will signal the switch mechanism 60 through line 90, to block out an input current signal from generator 16 to therefore supply traction motor 10 with the necessary electrical power from the battery to provide a drive mode of the vehicle. If storage battery 14 should be in a low-charge condition, then ICE 12 can be independently started to operate generator 16 to replenish or supply the necessary current; this, again, being sensed by controlled 80, which then causes switch 60 to be activated to the proper position until the current from generator 16 is no longer needed.

Assume now that the traction motor has been in operation, and is being supplied with current from storage battery 14 for the drive mode of operation. Also assume that the vehicle operator initiates a coast position by removing his foot from the vehicle accelerator pedal. The traction motor 10 then enters the regenerative braking mode converting the motor to a generator while providing engine braking to the vehicle wheels. An input signal from traction motor 10 sent through line 94 to controller 80 causes the latter to operate switch mechanism 60. If the storage battery 14 is only partially charged, then regenerative current will flow into the same to charge it. If battery 14 is already fully charged, then this being detected by controller 80 causes switch mechanism 60 to redirect the regenerative braking electrical energy to the resistive heater 42. The coolant circulation pump 58 then will be activated to circulate ICE coolant throughout the engine circuitry as needed.

For example, if the ICE is inoperative or in a non-running state, and its temperature level as sensed by sensor 48 is lower than a predetermined value desired for starting the engine, then heat from heater 42 will circulate from pump 58 through line 18 through the ICE 12 and out therefrom through line 28. This will preheat the ICE to its operating temperature prior to start-up so that there will be lower emission output at start-up. On the other hand, if the ICE coolant is already at its operating temperature, as soon as the flow from pump 58 enters ICE 12, the engine coolant pump 26 will be activated by controller 80 sensing the temperature to flow coolant through the conventional radiator 24 and back into the ICE 12, in a conventional manner to cool the coolant.

In either case, the output of coolant from the ICE in line 28 will continue to be circulated back to the resistive heater past the passenger compartment heater 30 and the heat battery 40. In the event that the passenger compartment heater 30 needs heat, then controller 80 will maintain the bypass valve 56 closed in response to the signal from temperature sensor 46 and heated coolant will pass into and through the passenger compartment heater into line 32. If the heater is already at its desired operating temperature, the controller 80 through sensor 46 will open valve 56 and allow a bypass of heated coolant through line 54.

Continuing, the heated coolant in line 32, if still of high enough value, can pass into the heat battery 40 for storage, so long as sensor 44 indicates that its capacity for storage has not been reached. In the unlikely event of the latter, the signal from sensor 44 to controller 80 will open the bypass valve 52 to flow the coolant around the heat battery and back into the resistive heater inlet 32 line 36. The flow then continues again in the same circulatory path and will be dissipated in the heat exchanger radiator 23 if not already so prior to entry therein.

From the foregoing, therefore, it will be seen that the invention provides an automotive hybrid vehicle with a traction motor that operates in a drive mode being supplied with electrical energy from either a storage battery or an ICE generator to provide a drive mode to the vehicle. Upon braking, the traction motor is converted for regenerative braking into a generator providing a source of electrical energy that is used to recharge the storage battery 14 or diverted to be fully utilized by a number of ICE related components, rather than wasted.

While the invention has been shown and described in its preferred embodiment, it will be clear to those skilled in the arts to which it pertains that many changes and modifications may be made thereto without departing from the scope of the invention.

We claim:

1. An automotive series hybrid vehicle having an electric traction motor with a drive mode and a regenerative braking mode, the latter mode producing a source of useful electrical energy, and means to utilize the electrical energy, including a storage battery power source for driving the traction motor, an internal combustion engine driven generator for supplying electrical energy to the traction motor and for charging the battery power source, switch means operable to control distribution of electrical energy from the generator to the traction motor and battery during the drive mode and from the traction motor to the battery and other means to to utilize the electrical energy during the regenerative braking mode, a liquid coolant circuit having a plurality of liquid coolant circuit containing elements which includes the internal combustion engine, a vehicle passenger compartment heater element, a vehicle radiator type heat exchanger element, and a high capacity heat storage battery, electrical resistive heater means in the coolant circuit and connected through the switch means to the traction motor and being operable at times in response to the establishment of the regenerative braking mode of the traction motor to receive surplus electrical energy therefrom for heating the coolant for selective distribution to one or more of the coolant circuit containing elements, and controller means operably connected to the switch means, the resistive heater means, and the plurality of coolant circuit containing elements for controlling the distribution of electrical energy to and from the traction motor during the drive and regenerative braking modes of operation.

2. A vehicle as in claim 1, said controller means being operable in response to and receiving input electrical signals from each of the plurality of coolant circuit containing elements, the signals being indicative of the state of operation of the elements and coolant temperatures thereof.

3. A vehicle as in claim 2, including electric pump means in the circuit energizable in response to operation of the switch means directing regenerative braking energy to the load means, to circulate coolant through the internal combustion engine and the plurality of coolant circuit containing elements, to pre-warm the internal combustion engine below a predetermined coolant temperature during inoperativeness of the ICE.

4. A vehicle as in claim 2, said high capacity heat storage battery being in series with the resistive heater means and downstream thereof for storing regenerative electrical energy diverted from the resistive heater means.

5. A vehicle as in claim 2, said vehicle passenger car heater element being in series with the resistive heater means and downstream therefrom.

6. A vehicle as in claim 2, said vehicle radiator type heat exchanger being in a closed loop coolant circuit arrangement with the internal combustion engine for cooling the same.

7. A vehicle as in claim 2, said high capacity heat storage battery and said passenger car heater being in series arrangement with the resistive heater means and downstream thereof.

8. A vehicle as in claim 3, including an internal combustion engine driven coolant pump and means responsive to the coolant exceeding a predetermined temperature level for activating the coolant pump to circulate coolant through the heat exchanger element to cool the coolant.

9. A vehicle as in claim 4, first including bypass means to bypass coolant around the heat battery, and temperature responsive means connected to the controller means and responsive to the attainment of a predetermined temperature level indicative of the capacity level of the heat battery.

10. A vehicle as in claim 9, said passenger car heater being in series with the heat battery and downstream thereof for receiving heated coolant bypassed from the heat battery.

11. A vehicle as in claim 10, the passenger car heater including second bypass means for bypassing means to the internal combustion engine coolant distributed to the car heater from the resistive heater means, and temperature responsive means operably connected to the controller means and responsive to the attainment of a predetermined temperature level for bypassing the coolant to the ICE.

12. A vehicle as in claim 11, the second bypass means including valve means operable in response to the temperature responsive means and controlled by the controller means to block and unblock the second bypass means.

13. An automotive series hybrid vehicle having an electric traction motor with a drive mode and a regenerative braking mode, the latter mode producing a source of useful electrical energy, and means to utilize the electrical energy, including a storage battery power source for driving the traction motor, an internal combustion engine driven generator for supplying electrical energy to the traction motor and for charging the battery power source, switch means operable to control distribution of electrical energy from the generator to the traction motor and battery during the drive mode and from the traction motor to the battery and other means to to utilize the electrical energy during the regenerative braking mode, a liquid coolant circuit having a plurality of liquid coolant circuit containing elements which includes the internal combustion engine and a high capacity heat storage battery, electrical resistive heater means in the coolant circuit and connected through the switch means to the traction motor and being operable at times in response to the establishment of the regenerative braking mode of the traction motor to receive surplus electrical energy therefrom for heating the coolant for selective distribution to one or more of the coolant circuit containing elements, and controller means operably connected to the switch means, the resistive heater means, and the plurality of coolant circuit containing element for controlling the distribution of electrical energy to and from the traction motor during the drive and regenerative braking modes of operation.

* * * * *